United States Patent [19]
Scheets

[11] 3,813,671
[45] May 28, 1974

[54] SYSTEM FOR MEASURING RANGE TO AN ELECTROMAGNETIC RADIATION SOURCE

[75] Inventor: David F. Scheets, Corona, Calif.

[73] Assignee: The United States of America as represented by the Secretary of the Navy, Washington, D.C.

[22] Filed: Jan. 16, 1968

[21] Appl. No.: 699,757

[52] U.S. Cl............................................. 343/112 D
[51] Int. Cl.............................................. G01s 5/12
[58] Field of Search................................ 343/112.3

[56] References Cited
UNITED STATES PATENTS
3,090,957   5/1963   Albanese et al................ 343/112 D

*Primary Examiner*—Richard A. Farley
*Assistant Examiner*—Richard E. Berger
*Attorney, Agent, or Firm*—Richard S. Sciascia; Joseph M. St. Amand; T. M. Phillips

[57] ABSTRACT

A system for passively determining range to an electromagnetic radiation source. Three receiving antennas are utilized with two antennas widely spaced apart with two spaced one-half to one wavelength apart. The output signals from the two pairs of antenna having a common antenna are used to compute range.

2 Claims, 1 Drawing Figure

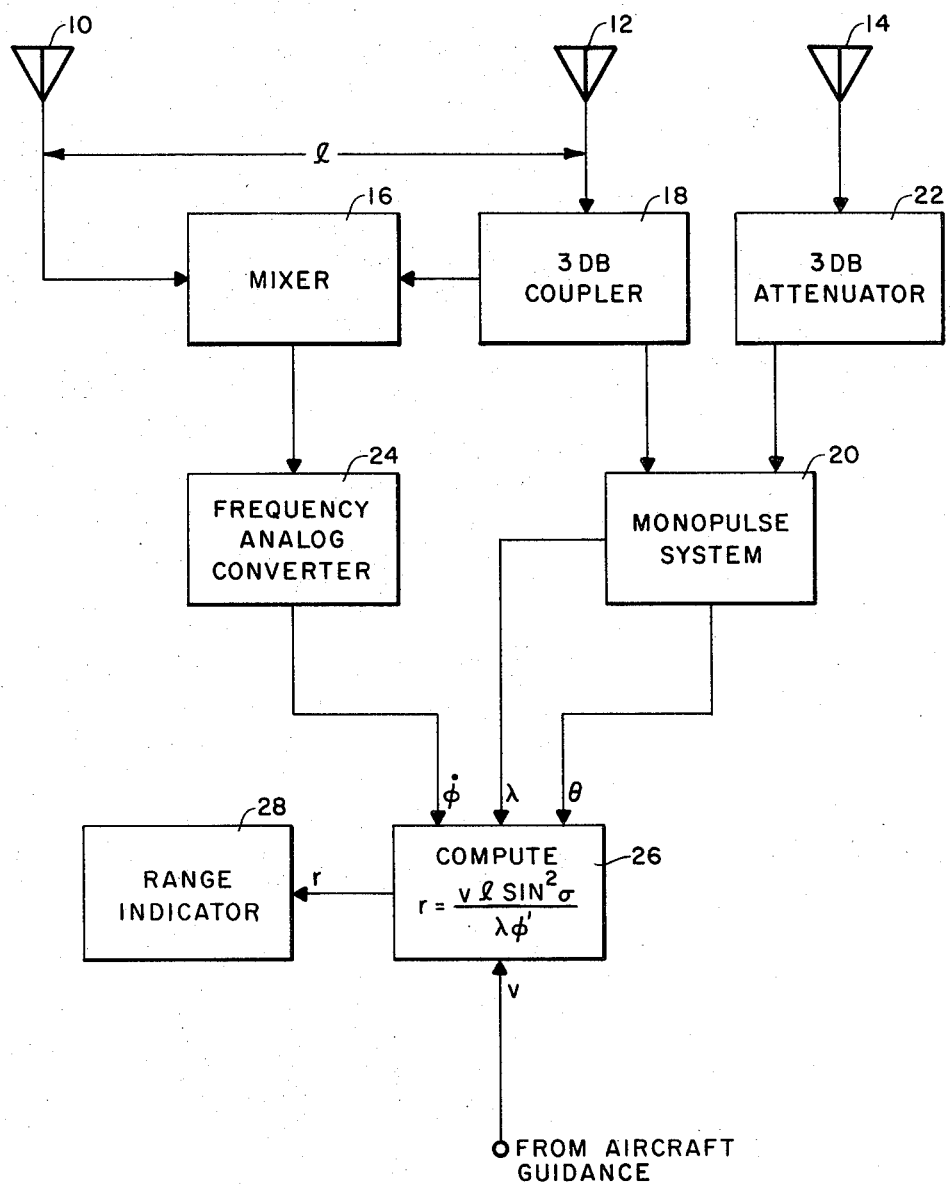

3,813,671

SYSTEM FOR MEASURING RANGE TO AN ELECTROMAGNETIC RADIATION SOURCE

BACKGROUND OF THE DISCLOSURE

The invention herein described may be manufactured and used by or for the Government of the United States of America for governmental purposes without the payment of any royalties thereon or therefor.

The present invention relates to systems for measuring range to an electromagnetic radiotion source and more particularly to range measuring systems which are free of operational maneuvers and complicated processing equipment.

Prior known ranging techniques have employed triangulation and the special case solutions of the angle-angular rate ($\theta - \dot\theta$) methods. The triangulation method is time consuming and requires complex instrumentation to achieve accuracy. The special $\theta - \dot\theta$ techniques require aircraft maneuvers which are not optimum in operational situations.

The present invention provides a passive ranging system which neither requires maneuvering of the aircraft or complicated processing equipment. Signals received from first and second antennas which are spaced a great distance apart are combined to provide a signal proportional to the frequency. Signals received by the second and a third antenna are processed in a monopulse system to provide signals proportional to the wavelength of the incoming electromagnetic signal and the angle between the direction of velocity of the measurement platform and the line of sight to the radiating device. These signals are combined with the relative velocity signal of the aircraft with respect to the electromagnetic source to provide an output signal proportional to range.

Many of the attendant advantages of this invention will become readily appreciated as the same becomes better understood by reference to the following detailed description when considered in connection with the accompanying drawing wherein there is shown in the single FIGURE a preferred embodiment.

Referring now to the drawing there is shown antennas 10 and 12 widely spaced apart (approximately one hundred wavelengths) and antenna 14 closely spaced to antenna 12 (one-half to one wavelength as is common in a monopulse system). The signal received at antenna 10 is fed to mixer 16. The signal received at antenna 12 is fed to a three decibel directional coupler 18 where one-half the signal is fed to mixer 16 and one-half the signal is fed to monopulse system 20. The signal received at antenna 14 is fed to a three decibel attenuator 22 to provide balanced inputs to monopulse system 20 which produces output $\theta$ signals and $\lambda$ signals. The output from mixer 16 is fed to frequency analog converter 24 which converts the difference frequency out of mixer 16 to a voltage signal.

Signals $\phi$, $\lambda$, $\theta$, and V are all fed into the analog computer 26 which generates an output signal proportional to range and is displayed on range indicator 28.

In operation, mixer 16 may be of the square law mixer type described in Radar System Engineering by Louis N. Ridenour, Vol. I, MIT Rad-Lab Series McGraw-Hill (1947). Monopulse system 20 may be of the type shown and described in Introduction to Monopulse by Donald R. Rhodes, McGraw-Hill (1959). Analog computer 26 is an analoge device which solves the following relationship for range, $r = v' \sin^2 \theta / \lambda \dot\phi$.

The difference frequency, $\dot\phi$, is related to the spacing of antennas 10 and 12, $l$, and the angle between the perpendicular to the incoming electromagnetic wave and a line between the two antennas, $\theta$, by the following relationship:

$\dot\phi = 2\pi l/\lambda \sin \theta \times \dot\theta$ and $\dot\phi = l/\lambda \sin \theta \times \dot\theta$ where $\dot\phi$ is expressed in cycles per second and $\lambda$ is the wavelength of the incoming electromagnetic signals.

Obviously many modifications and variations of the present invention are possible in the light of the above teachings. It is therefore to be understood that within the scope of the appended claims the invention may be practiced otherwise than as specifically described.

What is claimed is:

1. In a passive range measuring device for determining the range to a source radiating electromagnetic energy, the combination comprising:
   a. a monopulse system for receiving and processing pulsed electromagnetic signals to produce output signals proportional to the wavelength of the incoming signal and the angle between the direction of velocity of the measuring device and the line of sight to the radiating source,
   b. antenna receiving means positioned at least one hundred wavelengths from said monopulse system for receiving the radiating signals,
   c. mixer circuit means coupled to said antenna receiving means and to said monopulse system and providing an output proportional to the difference in frequency of the signals received at said antenna receiving means and signals received at said monopulse system,
   d. computer circuit means coupled to said mixer circuit means and to said monopulse system for generating an output signal proportional to the range of said measuring device to the radiating source.

2. In a passive range measuring device for determining the range to a source radiating electromagnetic energy, the combination comprising:
   a. first antenna receiving means for receiving energy radiated from a source,
   b. second antenna receiving means positoned at least one hundred wavelengths from said first antenna receiving means for receiving energy from said radiating source,
   c. third antenna receiving means positioned not more than one wavelength from said second antenna receiving means for receiving energy from said radiating source,
   d. directional coupling means coupled to said second antenna receiving means for coupling one-half the energy received to a first output and the other half of the energy received to a second output,
   e. mixer circuit means having a first input coupled to said first antenna receiving means and a second input coupled to the first output of said directional coupling means for producing an output signal proportional to the difference frequency of the energy received at said first and second antenna receiving means,
   f. a monopulse system coupled to the second output of said directional coupling means and to said third antenna receiving means for producing a first signal proportional to the wavelength of the incoming signal and a second signal proportional to the angle between the direction of velocity of the measuring device and the line of sight to the radiating source, g. analog computer means having a first input coupled to the output of said mixer circuit means, a second and third inputs coupled to said monopulse system, and a fourth input for receiving the velocity signal of said measuring device, for generating an output signal proportional to the range between said measuring device and the source of radiating signal.

* * * * *